United States Patent [19]
Shirochi et al.

[11] Patent Number: 5,359,463
[45] Date of Patent: Oct. 25, 1994

[54] RECORD/REPRODUCE APPARATUS HAVING MEANS FOR SWITCHING AUTOMATICALLY BETWEEN DIFFERENT TYPES OF AUDIO

[75] Inventors: Yoshiki Shirochi, Chiba; Hirokazu Takaoka, Kanagawa, both of Japan

[73] Assignee: Sony Corporation, Tokyo, Japan

[21] Appl. No.: 535,650

[22] Filed: Jun. 11, 1990

[30] Foreign Application Priority Data

Jun. 19, 1989 [JP] Japan .................. 1-156585

[51] Int. Cl.⁵ .............................. G11B 5/02
[52] U.S. Cl. ........................ 360/19.1; 360/20; 360/30; 360/61; 358/343; 348/482
[58] Field of Search ............ 360/30, 27, 19.1, 68, 360/20, 21, 61; 358/343, 330, 318; 369/86, 61; 348/479, 480, 481, 482, 483

[56] References Cited
U.S. PATENT DOCUMENTS 3,902,007  8/1975  Justice .................. 348/482
3,916,092  10/1975  Justice .................. 348/483 X

*Primary Examiner*—Andrew L. Sniezek
*Attorney, Agent, or Firm*—William S. Frommer; Alvin Sinderbrand

[57] ABSTRACT

Apparatus is provided for recording and reproducing video and audio signals on a record medium, wherein the audio signal may be of at least two different types subjected to respectively different types of audio processing. A recording section produces frequency modulated audio signal components and selectively adjusts the level of at least one FM audio signal component during the video blanking intervals as a function of the type of audio signal being modulated. Then, the FM audio signal components and the video signal are combined and recorded. A reproducing section separates the reproduced FM audio signal components from the reproduced video signal and detects the level of at least one separated FM audio signal component during blanking intervals. The FM audio signal components are demodulated and processed pursuant to a selected type of audio processing dependent upon the detected level of the FM audio signal component.

57 Claims, 3 Drawing Sheets

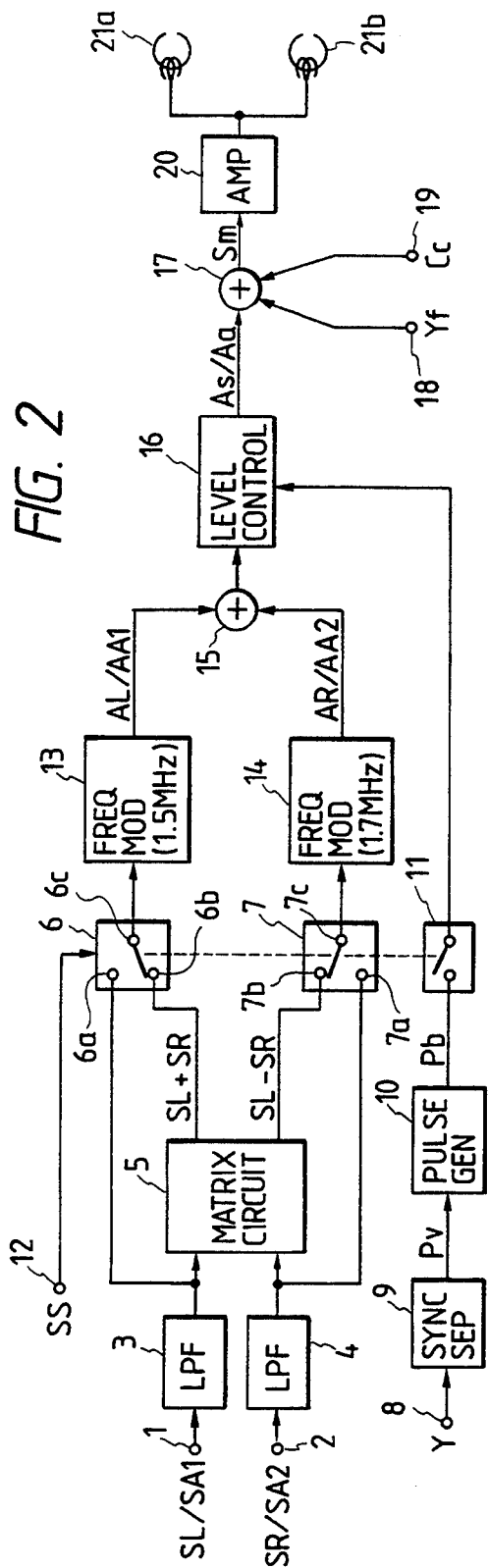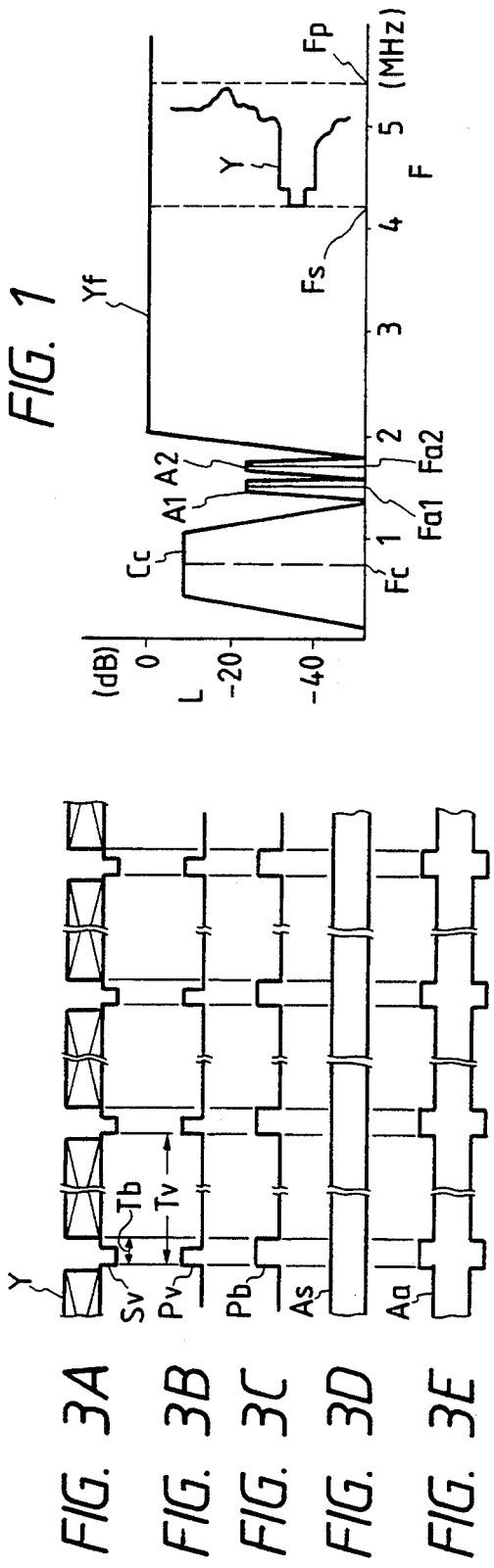

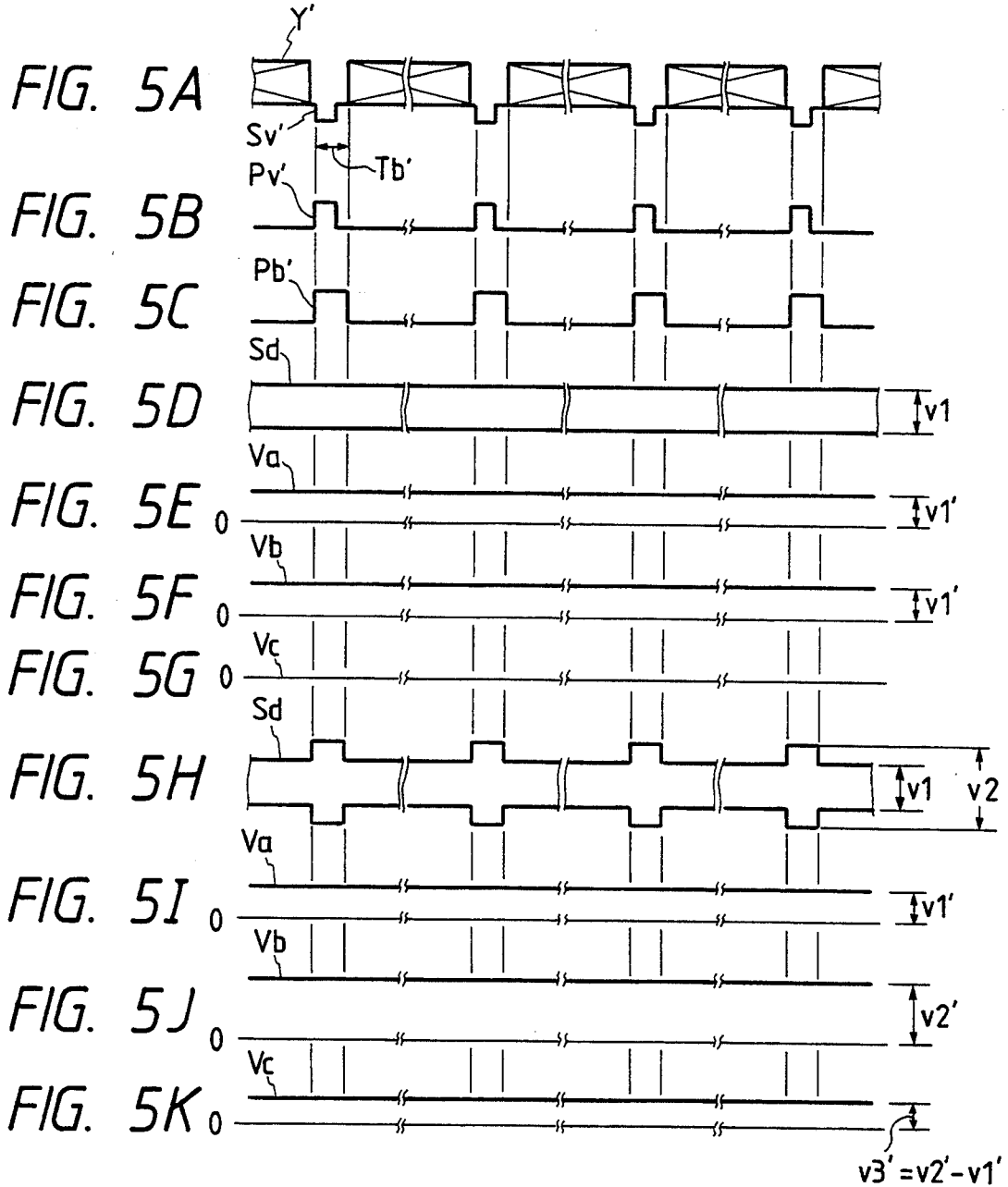

RECORD/REPRODUCE APPARATUS HAVING MEANS FOR SWITCHING AUTOMATICALLY BETWEEN DIFFERENT TYPES OF AUDIO

BACKGROUND OF THE INVENTION

1. Field of the Invention

This invention relates to recording and reproducing video and audio signals and, more particularly, to such apparatus wherein the audio signal that is recorded and reproduced with the video signal is subjected automatically to different types of signal processing, depending upon an indication of the type of audio signal being recorded.

2. Description of the Prior Art

Conventional video tape recorders record a color video signal by separating the luminance and chrominance signals and then shifting the frequency domains of the separated signals. Typically, the luminance signal is frequency modulated to a relatively high frequency band and the chrominance signal is frequency converted to a relatively low frequency band. The lower chrominance band and upper luminance band are mixed to form a processed video signal which is recorded in successive oblique tracks on a magnetic tape by rotary magnetic heads. An audio signal also is recorded on the same tape as the processed video signals; and in one type of video tape recorder, the audio signal is recorded in one or more longitudinal tracks adjacent an edge of the video tape.

To increase the recording density of the processed video signal, another type of video tape recorder transports the magnetic tape at a relatively slow speed. While this improves the recording density and permits a significantly longer recording time, slow tape speeds tend to deteriorate the quality of the audio signal. Accordingly, in this type of video tape recorder, the audio signal is frequency modulated and mixed with the processed video signal to be recorded by the rotary heads in the same oblique tracks as the video signal.

A typical frequency spectrum representing the mixed audio and processed video signals is illustrated in FIG. 1, wherein the abscissa represents frequency and the ordinate represents signal level. It is seen that the frequency-converted chrominance signal $C_c$ is recorded with a carrier frequency $f_c$ in a range that is well below the frequency band occupied by the frequency modulated luminance component $Y_f$. The audio signals are frequency modulated and occupy a range disposed within the relatively narrow space between the frequency-converted chrominance band and frequency modulated luminance band. In a typical video tape recorder of desired quality, the audio signals comprise stereophonic signals; and the two channels are recorded in two separate bands $A_1$ and $A_2$. Thus, one channel of the stereophonic signals frequency modulates one carrier frequency, for example, $f_{a1}$ and the other channel of stereophonic signals modulates another carrier frequency, for example, $f_{a2}$. Conventionally, the stereophonic channels are formed as a sum channel wherein the left-channel and right-channel audio components are summed (L+R), and a difference channel wherein the audio components are subtracted (L-R). As an example, the summed components (L-R) modulate carrier frequency $f_{a1}$ and the difference components (L-R) modulate carrier frequency $f_{a2}$.

In one application of recording stereophonic signals and video signals on a video recorder, carrier frequency $f_{a1}$ is on the order of about 1.5 MHz and is frequency modulated to exhibit a frequency deviation on the order of about 100 to 150 KHz. Carrier frequency $f_{a2}$ is on the order of about 1.7 MHz and is frequency modulated to exhibit a frequency deviation which also is on the order of about 100 to 150 KHz. The carrier frequency of the upper sideband of the frequency modulated luminance signal $Y_f$ ranges from a low frequency of about 4.2 MHz to a high frequency of about 5.4 MHz. The lower frequency (4.2 MHz) of the frequency modulated luminance signal represents the so-called sync tip, that is, the magnitude of the horizontal synchronizing signal, and the upper frequency (5.4 MHz) of the frequency modulated luminance signal represents the white peak level, that is, the maximum amplitude of the luminance signal. Thus, the carrier frequency of the frequency modulated luminance signal varies between the sync tip frequency $f_s = 4.2$ MHz and the white peak frequency $f_p = 5.4$ MHz. Finally, the carrier frequency $f_c$ of the frequency converted chrominance signal $C_c$ typically exhibits a color subcarrier frequency on the order of about 743 KHz.

As illustrated in the frequency spectrum of FIG. 1, the level of the frequency modulated luminance signal is greater than the level of the frequency-converted chrominance signal which, in turn, is greater than the level of the frequency-modulated audio signal components $A_1$ and $A_2$.

When the video tape recorder is used to record stereophonic audio signals with the processed video signals, the recording circuitry typically is provided with a stereophonic matrix circuit for producing the sum signal (L+R) and the difference signal (L-R) from the separate left-channel and right-channel audio signals supplied thereto. The reproducing circuitry of such a video tape recorder typically includes a frequency demodulator to demodulate audio signal components $A_1$ and $A_2$ and thereby recover the sum signal (L+R) and difference signal (L-R), respectively, and these recovered sum and difference signals are applied to a receiver matrix circuit to reproduce therefrom the left-channel and right-channel signals L and R. There are times, however, when it is desired to record two separate audio channels on the magnetic tape that are not stereophonic signals. For example, audio component $A_1$ may comprise a main audio channel and audio component $A_2$ may comprise an auxiliary audio channel. A typical application of main and auxiliary audio channels is found in bilingual audio processing wherein the main channel contains information of a primary language and the auxiliary channel contains information of a secondary language. For example, in recording a video program, the main channel may represent the language in which the original actors speak (such as a foreign language) and the auxiliary channel may represent a dubbed, translated language (such as an English translation). In this environment, when the main and auxiliary audio channels are played back, a user may select one or the other for sound reproduction.

Video tape recorders having the capability of recording either stereophonic audio signals or main/auxiliary channel audio signals should be provided with means to supply the carrier frequencies $f_{a1}$ and $f_{a2}$ either with sum and difference stereophonic signals or with main and auxiliary audio channels, and means should be provided to selectively enable or disable the stereophonic matrix circuit. Likewise, the reproducing circuitry should be provided with means to recover the main/auxiliary audio channels or the sum and difference stereophonic signals, depending upon which type of audio signal is recorded (i.e. whether bilingual or stereophonic audio signals are recorded). Here too, the reproducing circuitry should include means to selectively enable and disable the reproducing matrix circuit. Stated more generally, when stereophonic audio signals are to be recorded and reproduced, such signals are subjected to one type of audio processing; but when bilingual (or other types of) audio signals are to be recorded and reproduced, those bilingual (or other types of) audio signals are subjected to a different type of audio processing. Preferably, if the recorder is to have the capability of recording various different types of audio signals, each subjected to a respectively different type of audio processing, the video recorder should include the requisite audio processors and means to select or match the proper processor with the type of audio signal being recorded. Of course, for compatibility, reproducing circuitry likewise should include different types of audio processors with means to match the proper processor with the particular type of audio signal being reproduced. Such selecting and matching of the proper audio processor to the particular type of audio signal being recorded/reproduced may be effected by manually operated switches wherein a user operates a particular switch to select a particular audio processor compatible with the type of audio signal being recorded. Likewise, during reproduction, the user carries out a similar manual switching operation.

While the use of manually operated switches in the recording circuitry presents no difficulty because the user is acutely aware of the type of audio signal being recorded, a user may not be aware of the proper switch to operate during reproduction because he may not be aware of the type of audio signal that had been recorded. Still further, automatic switching likewise may be difficult to implement. For example, although a pilot signal normally is contained in a stereophonic audio signal and, thus, the pilot signal may be detected and used to select a stereophonic matrix circuit during recording, the pilot signal may not be readily available to control a similar automatic switching of the proper audio processing circuit in the reproducing circuitry.

OBJECTS AND SUMMARY OF THE INVENTION

Therefore, it is an object of the present invention to provide apparatus for recording and automatically reproducing audio signals of different types which may be subjected to different types of audio processing, these audio signals being recorded together with video signals by, for example, a video tape recorder.

Another object of this invention is to provide improved apparatus for recording and reproducing video and audio signals, the latter signals being any one of different predetermined types.

Still another object of this invention is to provide apparatus as aforesaid wherein the type of audio signal being recorded is indicated and such indication is used to control the processing thereof during reproduction.

An additional object of this invention is to provide recording apparatus for recording video and audio signals and for processing the audio signals in a predetermined manner compatible with the type of audio signals being recorded.

A still further object of this invention is to provide recording apparatus of the aforementioned type wherein an indication of the type of audio signal is recorded therewith.

Another object of this invention is to provide improved reproducing apparatus for reproducing video and audio signals and for automatically controlling the processing of such audio signals in accordance with their particular type.

A still further object of this invention is to provide reproducing apparatus as aforesaid wherein an indication of the type of audio signal is recorded therewith and is used during reproduction to select the type of audio processing.

Various other objects, advantages and features of the present invention will become readily apparent from the ensuing detailed description, and the novel features will be particularly pointed out in the appended claims.

In accordance with this invention, apparatus is provided for recording and reproducing video and audio signals on a record medium wherein the audio signal may be of at least two different types subjected to respectively different types of audio processing. A recording section includes an FM modulator for producing frequency modulated audio signal components and a level adjuster for selectively adjusting the level of at least one FM audio signal component during video signal blanking intervals as a function of the type of audio signal being modulated. The FM audio signal components are combined with a video signal for recording.

The apparatus also includes a reproducing section which separates the reproduced FM audio signal components from the video signal and detects the level of at least one separated FM audio signal component during video signal blanking intervals. The audio signals are demodulated and processed in a manner consistent with the type of audio signal that had been recorded, the processing being a function of the detected level of the separated FM audio signal component.

As an aspect of this invention, the FM audio signal components comprise two audio channels, each being frequency modulated onto a respective carrier. Preferably, a selector, such as a switching arrangement, selects one type or another type of audio signal to be supplied to the modulators. Depending upon which type of audio signal is selected, the level of at least one of the modulated carriers is changed during the video signal blanking intervals.

In one embodiment, the blanking intervals comprise vertical blanking intervals. In another embodiment, the blanking intervals comprise horizontal blanking intervals.

As one example, one type of audio signal comprises a stereophonic signal; and the recording section includes a matrix circuit to produce sum and difference audio channels which are supplied to the respective modulator circuits. Another type of audio signal comprises main and auxiliary audio channels, as are used in bilingual audio programs, with the main and auxiliary audio channels being supplied to the respective modulator circuits. Preferably, the level of one or both of the frequency modulated carriers during the video blanking intervals is increased when the main and auxiliary audio channels are supplied to the modulators, thereby indicating the type of audio signal being recorded.

As a further aspect of this invention, level detection is carried out in the reproducing circuitry by detecting the video blanking intervals in the reproduced video signal and generating a sampling signal during (preferably, coextensive with) the blanking interval to sample the level of the reproduced FM audio signal component(s). Advantageously, the sampled level is compared to a reference amplitude; and in one embodiment, this reference amplitude is produced by sensing the envelope amplitude of the FM audio signal component(s) extant between blanking intervals.

As another aspect of this invention, the reproducing circuitry includes a processing circuit for processing the audio signal components after the FM demodulation thereof. Depending upon the type of audio signal which is reproduced, either processed or unprocessed audio signals are selected to be coupled to the output of the apparatus. In one embodiment, the selection is made by a switching arrangement.

If the recorded audio signal is a stereophonic audio signal having sum and difference components frequency modulated onto respective carriers, the reproducing circuitry may include a stereophonic matrix circuit which combines the demodulated sum and difference components to produce left and right channel audio signals. If the recorded audio signals are not stereophonic signals, for example, if they comprise main and auxiliary channels (as provided in bilingual audio programs), the aforementioned switching arrangement responds to the sampled envelope of the FM audio signal component(s) to select either the matrixed left and right stereophonic channels or the main and auxiliary channels. That is, the audio processing circuit is selectively connected or bypassed, depending upon the level of the FM audio signal component(s) during the blanking intervals.

BRIEF DESCRIPTION OF THE DRAWINGS

The following detailed description, given by way of example and not intended to limit the present invention solely thereto, will best be understood in conjunction with the accompanying drawings in which:

FIG. 1 is a graphical representation of the typical frequency spectrum occupied by the luminance, chrominance and audio signals recorded on a magnetic medium;

FIG. 2 is a block diagram of a preferred embodiment of the recording section of apparatus in accordance with the present invention;

FIGS. 3A-3E are waveform diagrams which are helpful in understanding the operation of the embodiment shown in FIG. 2;

FIGS. 5A-5K are waveform diagrams which are helpful in understanding the operation of the embodiment shown in FIG. 4.

DESCRIPTION OF THE PREFERRED EMBODIMENTS

Figure 4:
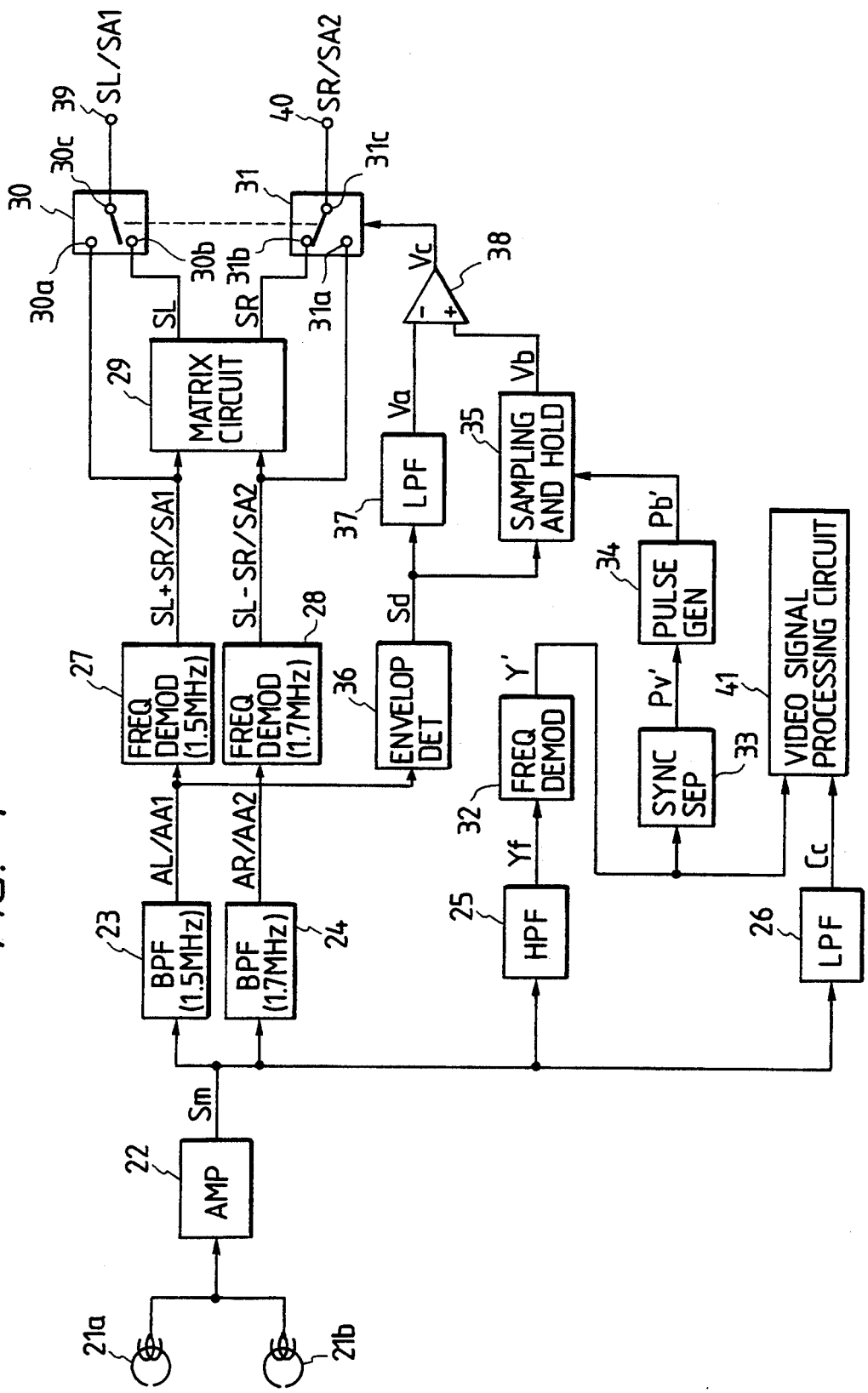
FIG. 4 is a block diagram of a preferred embodiment of the reproducing section of apparatus in accordance with the present invention.

Referring now to FIG. 2, there is illustrated a block diagram of the recording section of apparatus for recording both video and audio signals onto a record medium, such as magnetic tape. In the interest of brevity, only that portion of the recording section which is related to the instant invention is illustrated. The illustrated recording circuitry includes input terminals 1 and 2, an audio signal processing circuit 5, frequency modulators 13 and 14, a level adjusting circuit 16 and a combining circuit 17. Input terminals 1 and 2 are adapted to receive audio signals supplied thereto in separate channels. For example, if the illustrated recording circuitry is adapted to record stereophonic audio signals, a left-channel audio signal SL is supplied to input terminal 1 and a right-channel audio signal SR is supplied to input terminal 2. Alternatively, if the illustrated recording circuitry is adapted to record bilingual audio information, a main audio channel SA1 is supplied to input terminal 1 and an auxiliary audio channel SA2 is supplied to input terminal 2. For example, the main audio channel SA1 may contain audio information in the language in which an original program is recorded (e.g. English) and the auxiliary audio channel SA2 may contain audio information representing a foreign language for dubbing a foreign translation of that program. The respective channels of audio signals, whether they are left-channel and right-channel signals or main channel and auxiliary channel signals, are filtered by low pass filters 3 and 4, respectively.

Stereophonic signal processing circuit 5 preferably comprises a matrix circuit (and is referred to hereinafter simply as a matrix circuit) of conventional type. The matrix circuit is coupled to low pass filters 3 and 4 and is adapted to produce sum and difference audio signals (SL+SR) and (SL−SR) from the filtered left and right channel audio signals supplied to input terminals 1 and 2. It is recognized that if main and auxiliary audio channels are supplied to the input terminals, matrix circuit 5 would attempt to combine those channels to produce sum and difference signals, even though such sum and difference main and auxiliary signals are unintelligible. The present invention prevents such unintelligible signals from being recorded.

The sum channel (SL+SR) produced by matrix circuit 5 is coupled to one input 6b of a selector switch 6 and the difference channel (SL−SR) is coupled to one input 7b of a selector switch 7, these switches merely being shown schematically. Selector switch 6 includes another input 6a coupled directly to low pass filter 3 and, similarly, selector switch 7 includes another input 7a coupled directly to low pass filter 4. Accordingly, selector switches 6 and 7 are adapted to select audio signals that are processed by matrix circuit 5 or audio signals that are not processed by the matrix circuit. Switches 6 and 7 are coupled to frequency modulators 13 and 14, respectively. Frequency modulator 13 is adapted to modulate a carrier frequency $f_{a1}$ with the audio signal supplied thereto by switch 6. Similarly, frequency modulator 14 is adapted to modulate a carrier frequency $f_{a2}$ with the audio signal supplied by switch 7. As a numerical example, $f_{a1}=1.5$ MHz and $f_{a2}=1.7$ MHz.

The switching state, or condition, of switches 6 and 7 is determined by a control signal SS supplied to a control input terminal 12. The control signal is adapted to control the switches to couple the main and auxiliary audio channels provided at the outputs of filters 3 and 4 to frequency modulators 13 and 14 and, additionally, is adapted to close another switch 11, to be described. Preferably, when audio processing circuit 5 is not to be used, the control signal is present. Alternatively, in the absence of control signal SS, switches 6 and 7 are operated to connect the sum and difference audio signals produced by matrix circuit 5 to frequency modulators 13 and 14, respectively; and, in addition, switch 11 is opened. Accordingly, in one application of the illustrated recording circuitry, the control signal SS is absent when stereophonic audio signals are supplied to input terminals 1 and 2, and the control signal is present when main and auxiliary audio channels are supplied to the input terminals.

The frequency modulated audio signals produced by frequency modulators 13 and 14 are adapted to exhibit a frequency deviation range of about ±100 KHz. These frequency modulated signals are supplied to level adjusting circuit 16 by a mixing circuit 15. It will be appreciated that the FM audio signals produced by frequency modulators 13 and 14 exhibit the frequency characteristics shown in FIG. 1 as components $A_1$ and $A_2$, respectively. The level adjusting circuit is adapted to change the level, or envelope amplitude, of the FM audio signals supplied thereto in response to a level control signal produced by switch 11. For example, and as will be described, when this switch is closed, the envelope amplitude of the FM audio signal is increased by a predetermined amount. Conversely, when switch 11 is opened, no change in the envelope amplitude of the FM signals is produced. It will be appreciated that, if desired, the level control signal supplied to level adjusting circuit 16 by switch 11 may be operative to reduce the envelope amplitude of the FM audio signals.

The level control signal applied to level adjusting circuit 16 by switch 11 is produced by a synchronizing signal separator circuit 9 (referred to as a sync separator) and a pulse generator. Sync separator 9 is coupled to an input terminal 8 adapted to receive the luminance component Y of the video signal to be recorded. In one embodiment, sync separator 9 is adapted to separate the vertical synchronizing signal $P_v$ from the luminance component. In an alternative embodiment, the sync separator functions to separate the horizontal synchronizing signal from the luminance component. In either embodiment, the separated synchronizing signal is supplied to pulse generator 10 to trigger the pulse generator to produce a pulse signal $P_b$. The pulse generator may comprise a one-shot circuit, or the like, adapted to generate a pulse $P_b$ of predetermined duration. In the preferred embodiment, this duration is equal to the blanking interval in which the separated synchronizing signal is provided. Thus, pulse $P_b$ may exhibit a duration equal to the vertical blanking interval or, in the alternative embodiment the pulse may exhibit a duration equal to the horizontal blanking interval. When switch 11 is closed, this pulse $P_b$ is supplied to level adjusting circuit 16. Thus, it will be seen that the level adjusting circuit operates to increase the envelope amplitude of the FM audio signals supplied thereto over an interval substantially equal to the blanking interval included in the video signal.

The output of level adjusting circuit 16 comprises an FM audio signal whose envelope amplitude is selectively increased during the video signal blanking intervals, depending upon whether control signal SS is applied to input terminal 12. In the example described herein, if the audio signals applied to input terminals 1 and 2 are stereophonic audio signals, level adjusting circuit 16 provides an FM audio signal $A_s$ whose envelope amplitude remains constant, even during the blanking intervals. Alternatively, if the audio signals applied to input terminals 1 and 2 comprise main and auxiliary audio channels, level adjusting circuit 16 produces an FM audio signal $A_a$ whose envelope amplitude is increased during the video blanking intervals. This level adjusted FM audio signal $A_s/A_a$ is applied to combining circuit 17 together with a frequency modulated luminance signal $Y_f$ supplied to an input terminal 18 and a frequency-converted chrominance signal $C_c$ supplied to an input terminal 19.

The frequency characteristics of the frequency modulated luminance signal and the frequency-converted chrominance signal are illustrated in FIG. 1. It is appreciated, then, that the frequency modulated audio signal $A_s/A_a$ may be combined with the frequency modulated luminance signal $Y_f$ and with the frequency-converted chrominance signal $C_c$ with substantially no distortion therein. The resultant mixed signal $S_m$ is applied to transducers 21a and 21b via a recording amplifier 20. Although not shown, it will be appreciated that transducers 21a and 21b are mounted for rotary operation and scan successive, parallel, oblique tracks across a moving magnetic tape. The manner in which such tracks are recorded is conventional and forms no part of the present invention per se. Suffice it to say that the FM audio signals are recorded concurrently with the video signals $Y_f$ and $C_c$.

In operation, let it be assumed that left-channel and right-channel components of stereophonic audio signals are supplied to input terminals 1 and 2, respectively. Accordingly, the control signal SS is not applied to input terminal 12. Hence, the left-channel audio signal SL is supplied to matrix circuit 5 by low pass filter 3 which limits the uppermost frequencies therein to be less than the video signal horizontal line frequency $f_h$. Similarly, the right-channel audio signal SR is supplied to the matrix circuit by low pass filter 4 which limits the uppermost frequencies therein to be less than the horizontal line frequency $f_h$. In the absence of control signal SS, switches 6 and 7 operate to couple the sum and difference channels (SL+SR) and (SL-SR) from matrix circuit 5 to frequency modulators 13 and 14, respectively. Carrier frequency $f_{a1}$ is modulated by the sum channel to produce the FM audio signal component AL; and carrier frequency $f_{a2}$ is modulated by the difference channel to produce the FM audio signal component AR. These FM audio signal components are combined in mixing circuit 15 and supplied to combining circuit 17 by level adjusting circuit 16. The combined, or mixed FM audio signal components $A_s$ are not subjected to level adjustment in level adjusting circuit 16 because switch 11 remains opened and, thus, does not supply a level control signal to the level adjusting circuit. Hence, the amplitude of the FM audio signal components remains substantially constant even during the video signal blanking intervals. These FM audio signal components $A_s$ are combined with the frequency-modulated luminance signal $Y_f$ and the frequency-converted chrominance signal $C_c$ to produce the recording signal $S_m$ which is amplified and recorded in successive tracks on the record medium (e.g. on magnetic tape) by transducers 21a and 21b.

Now, let it be assumed that main and auxiliary channels SA1 and SA2 are applied to input terminals 1 and 2, respectively. At this time, the control signal SS is supplied to input terminal 12. Consequently, switches 6 and 7 are operated to couple the filtered main and auxiliary channels to frequency modulators 13 and 14, respectively. Also, switch 11 is closed to supply level adjusting circuit 16 with a level control signal.

It is seen that, when the main and auxiliary audio channels are supplied to filters 3 and 4, the presence of control signal SS serves to bypass matrix circuit 5. Consequently, the main auxiliary channel SA1 modulates carrier frequency $f_{a1}$ to produce FM audio signal component AA1. Likewise, the auxiliary audio channel SA2 modulates carrier frequency $f_{a2}$ to produce the FM audio signal component AA2. These FM audio signal components are combined in mixer 15 and are subjected to a level adjustment operation in level adjusting circuit 16. The manner in which the level adjusting operation is carried now will be explained with reference to the waveform diagrams illustrated in FIGS. 3A–3E.

FIG. 3A represents the luminance component Y supplied to input terminal 8 having vertical synchronizing signals $S_v$ which occur during the vertical blanking intervals $T_b$. Sync separator 9 serves to extract the vertical synchronizing signal $S_v$ from the luminance signal to produce vertical synchronizing pulses $P_v$, shown in FIG. 3B. It is recognized that successive ones of the extracted vertical synchronizing pulses $P_v$ define the field interval $T_v$.

Each separated vertical synchronizing pulse $P_v$ triggers pulse generator 10 to produce the level control pulse $P_b$ of duration equal to the vertical blanking interval $T_b$. These periodic level control pulses Pb are shown in FIG. 3C. When switch 11 is closed in response to the control signal SS, the level control pulses $P_b$ are supplied to level adjusting circuit 16 to vary the envelope amplitude of the FM audio signals supplied thereto. For example, the level adjusting circuit may comprise a gain controlled amplifier whose gain is increased in response to level control pulses $P_b$. Since these level control pulses are produced only during the vertical blanking interval $T_b$, the envelope amplitude of the FM audio signal components is increased only during the vertical blanking intervals. FIG. 3E illustrates the increased envelope amplitude of the FM audio signal components $A_a$ during the vertical blanking intervals $T_b$. Of course, it is this selectively adjusted FM audio signal $A_a$ (as shown in FIG. 3E) that is combined with the frequency-modulated luminance signal $Y_f$ and the frequency-converted chrominance signal $C_c$ for recording.

FIG. 3E is to be compared with FIG. 3D which illustrates the envelope of the stereophonic FM audio signal components $A_s$. It is seen that the envelope amplitude of the stereophonic FM audio signal components $A_s$ remains substantially constant and is not increased during the vertical blanking periods $T_b$ because, when the stereophonic left-channel and right-channel signals are supplied to input terminals 1 and 2, the control signal SS is absent and switch 11 remains opened. Hence, matrix circuit 5 is connected to the frequency modulators; and the level control pulses $P_b$, although produced by pulse generator 10, are not supplied to level adjusting circuit 16. In the absence of these level control signals, the gain of the gain controlled amplifier which may comprise the level adjusting circuit remains constant.

Thus, it will be recognized that the type of audio signal which is recorded by transducers 21a and 21b may be indicated by the envelope amplitude of the FM audio signal components. In the example described above wherein two different types of audio signals may be recorded, one type of audio signal (e.g. stereophonic signals) is indicated by a constant envelope amplitude of the FM audio signal components which are recorded, and the other type (e.g. bilingual audio signals) is indicated by a selectively increased envelope amplitude during the video blanking intervals. It will be appreciated that, if other types of audio signals are to be recorded, each being subjected to a different type of audio processing, the envelope amplitude of the FM audio signal components during the video blanking intervals may be varied as a function of the type of audio signal. That is, if three or more different types of audio signals are to be accommodated, then two, three or more different envelope amplitude levels may be provided during the video blanking intervals, with each envelope amplitude indicating a respective type of audio signal.

Although the embodiment shown in FIG. 2 has been described as selectively adjusting the envelope amplitude of the FM audio signal components during the vertical blanking intervals of the video signal, it is appreciated that this level adjustment may be carried out during the horizontal blanking intervals. In this alternative embodiment, sync separator 9 functions to separate the horizontal synchronizing pulses from the luminance signal supplied to input terminal 8.

As a further alternative, although level adjusting circuit 16 is illustrated as being coupled to receive the mixed FM audio signal components, the level adjusting circuit may be connected to the output of one or the other of frequency modulators 13 and 14, if desired. Thus, rather than adjusting the envelope amplitude of the mixed FM audio signal components, the level adjusting circuit may be connected so as to adjust the envelope amplitude of only one of these components.

Referring now to FIG. 4, there is illustrated a block diagram of the reproducing section of apparatus for reproducing both video and audio signals that have been recorded on a record medium, such as magnetic tape, by the recording section shown in FIG. 2. In the interest of brevity, only that portion of the reproducing section which is relevant to the instant invention is illustrated. The illustrated reproducing circuitry includes transducers 21a and 21b, audio and video separating circuits comprised of filters 23, 24, 25 and 26, frequency demodulators 27 and 28, an audio signal processing circuit 29, selector switches 30 and 31 and a level detector having a sampling circuit 35. Transducers 21a and 21b may be the very same transducers used to record the combined audio and video signals, as discussed above in conjunction with FIG. 2. It will, of course, be appreciated that the transducers shown in FIG. 4 may be included in reproducing apparatus which does not include a recording section. In any event, transducers 21a and 21b are conventional and are adapted to be rotatably driven for scanning successive tracks across a magnetic tape.

A playback amplifier 22 is coupled to transducers 21a and 21b to produce an amplified mixed signal $S_m$ having audio and video components. This mixed signal $S_m$ is applied to the separating circuits shown as filters 23–26. In particular, filters 23 and 24 are bandpass filters adapted to pass the FM audio signal components produced by frequency modulators 13 and 14, respectively. For example, bandpass filter 23 exhibits a relatively narrow pass band, such as on the order of about 200 KHz, centered on the carrier frequency $f_{a1}$, such as 1.5 MHz. Similarly, bandpass filter 24 has a limited pass band, such as on the order of about 200 KHz, centered on the carrier frequency $f_{a2}$, such as 1.7 MHz. Thus, if frequency modulator 13 produces the FM audio signal component AL when stereophonic audio signals are recorded, bandpass filter 23 is adapted to separate this FM audio signal component AL from the reproduced mixed signals $S_m$. Similarly, if frequency modulator 14 generates the FM audio signal component AR when stereophonic audio signals are recorded, bandpass filter 24 is adapted to separate this FM audio signal component AR from the reproduced mixed signals. Alternatively, if main and auxiliary channels are recorded by the circuitry shown in FIG. 2, then bandpass filters 23 and 24 separate the main and auxiliary FM audio signal components AA1 and AA2, respectively, from the reproduced mixed signals.

The output of amplifier 22 also is coupled to high pass filter 25 and to low pass filter 26. The high pass filter is adapted to separate the frequency modulated luminance signal $Y_f$ from the reproduced mixed signals $S_m$. Thus, the frequency characteristic of the high pass filter should be similar to, or at least compatible with, the frequency characteristic of the luminance signal $Y_f$ shown in FIG. 1. The output of high pass filter 25 is coupled to a frequency demodulator 32 which demodulates the frequency modulated luminance signal $Y_f$ to recover the luminance component $Y'$. This recovered luminance component is supplied to a video signal processing circuit 41 which forms no part of the present invention per se.

Low pass filter 26 is adapted to separate the frequency-converted chrominance signal $C_c$ from the reproduced mixed signals $S_m$. Accordingly, the frequency characteristic of the low pass filter should be similar to, or at least compatible with, the frequency characteristic for the frequency-converted chrominance signal $C_c$ illustrated in FIG. 1. The separated frequency-converted chrominance signal $C_c$ is supplied by low pass filter 26 to video signal processing circuit 41. The video signal processing circuit functions in conventional manner to produce a suitable color television signal.

The separated FM audio signal components AL/AA1 and AR/AA2 produced by bandpass filters 23 and 24, respectively, depending upon whether stereophonic or main/auxiliary channel audio signals are recorded, are coupled to frequency demodulators 27 and 28, respectively. These FM demodulators serve to demodulate the audio signals which had been used in the recording circuitry to modulate the carriers $f_{a1}$ and $f_{a2}$, respectively. For example, FM demodulator 27 is adapted to demodulate the audio signal which was used to modulate the carrier frequency of 1.5 MHz and FM demodulator 28 is adapted to demodulate the audio signal that had modulated the carrier frequency 1.7 MHz. It is appreciated, therefore, that if stereophonic audio signals had been recorded, FM demodulator 27 demodulates the sum component (SL+SR) and FM demodulator 28 demodulates the difference component (SL−SR) from the modulated carriers supplied thereto by bandpass filters 23 and 24, respectively. Alternatively, if main and auxiliary channel audio signals had been recorded, such as if bilingual audio signals had been recorded, FM demodulator 27 demodulates the main audio channel SA1 from the FM audio signal component AA1 passed by bandpass filter 23 and FM demodulator 28 demodulates the auxiliary audio channel SA2 from the FM audio signal component AA2 that is passed by bandpass filter 24.

The demodulated audio signals provided at the outputs of FM demodulators 27 and 28 are coupled to audio processing circuit 29 which, for example, comprises a stereophonic matrix circuit. The outputs of the FM demodulators also are coupled directly to inputs 30a and 31a of selector switches 30 and 31, respectively.

Matrix circuit 29 may be conventional and is adapted to combine the sum and difference components to produce a left channel audio signal SL and a right channel audio signal SR, respectively. These left channel and right channel audio signals are applied to inputs 30b and 31b of selector switches 30 and 31, respectively. It is recognized, depending upon the switching condition of these selector switches, that either matrix circuit 29 is bypassed such that the demodulated audio signals produced by FM demodulators 27 and 28 are coupled to output terminals 39 and 40, or the left channel and right channel audio signals produced by the matrix circuit are coupled to these output terminals. Hence, output terminal 39 is provided with either the recovered left channel audio signal SL or the main audio channel SA1, as represented by the designation "SL/SA1". Likewise, output terminal 40 is provided either with the recovered right channel audio signal SR or the auxiliary audio channel SA2, as represented by the designation "SR/SA2".

Switches 30 and 31 are controlled by a control signal produced as a function of the envelope amplitude of the FM audio signals reproduced from the record medium. Accordingly, the switching condition of selector switches 30 and 31 is determined by the detected amplitude of the FM audio signal amplitude. The envelope amplitude detector is comprised of an envelope detector 36, sampling circuit 35, a filter 37 and a comparator 38. Envelope detector 36 is coupled to the output of one of bandpass filters 23 and 24. In the illustrated embodiment, the envelope detector is coupled to receive the FM audio signal component passed by bandpass filter 23. It will be appreciated that the particular FM audio signal component supplied to the envelope detector is not critical and, in yet another alternative embodiment, both components may be supplied to the envelope detector.

Envelope detector 36 may be conventional and is adapted to detect the envelope of the FM audio signal components supplied thereto. The detected envelope $S_d$ is supplied to sampling circuit 35 whereat the amplitude of this envelope is sampled at predetermined time intervals determined by sampling pulses produced by a pulse generator 34. As will be described, these sampling pulses are produced during the blanking intervals of the reproduced video signal, such as the vertical blanking intervals. Such sampling pulses may be of a duration that is coextensive with the blanking interval.

The sampled envelope amplitude $V_b$ produced by sampling circuit 35 is coupled to comparator 38 whereat it is compared to the output of a low pass filter 37. This low pass filter is signal whose amplitude $V_a$ is approximately equal to the envelope amplitude $S_d$ of the FM audio signal component at times other than the blanking intervals. From FIG. 3E, it will be appreciated that the level changes in the envelope of the FM audio signal components during the blanking intervals may be thought of as rapidly changing components. Low pass filter 37 is adapted to block these rapidly changing components and, thus, the filter effectively passes the envelope amplitude of the FM audio signal component extant between blanking intervals. This filtered envelope level $V_a$ is supplied to another input of comparator 38 and functions as a reference amplitude to which the sampled level $V_b$ is compared.

Comparator 38 supplies to selector switches 30 and 31 the control signal $V_c$ which is a function of the comparison of the sampled level $V_b$ to the reference level $V_a$. If the sampled level $V_b$ does not exceed the reference level $V_a$ (or, alternatively, if the sampled level does not exceed the reference level by at least a predetermined amount), the control signal $V_c$ establishes the switching condition of switches 30 and 31 such that the left channel and right channel audio signals produced by matrix circuit 29 are coupled to output terminals 39 and 40. However, if $V_b > V_a$ (or, alternatively, if the sampled level exceeds the reference level by more than a predetermined amount), the control signal $V_c$ establishes the switching condition of switches 30 and 31 such that matrix circuit 29 is bypassed and the demodulated main and auxiliary audio channels produced by FM demodulators 27 and 28 are coupled to output terminals 39 and 40.

The sampling pulses $P'_b$ produced by pulse generator 34 are derived from synchronizing pulses $P'_v$ separated from the demodulated luminance component $Y'$ by a synchronizing signal separator circuit (or sync separator) 33. Pulse generator 34 may comprise a one-shot circuit triggered by the separated synchronizing pulse $P'_v$ to produce a sampling pulse $P'_b$ of predetermined duration. As mentioned above, in one embodiment, this duration preferably is equal to the blanking interval. In one embodiment, sync separator 33 separates vertical synchronizing pulses from the demodulated luminance component and pulse generator 34 generates sampling pulses $P'_b$ of duration equal to the vertical blanking interval. In another embodiment, sync separator 33 separates horizontal synchronizing pulses from the luminance component and pulse generator 34 generates sampling pulses $P'_b$ of duration equal to the horizontal blanking interval The manner in which the reproducing circuitry illustrated in FIG. 4 operates now will be described in conjunction with the waveforms shown in FIGS. 5A–5K. Transducers 21a and 21b rotate to scan successive tracks across the record medium and thereby recover the mixed signals $S_m$. The frequency modulated luminance signal $Y_f$, frequency-converted chrominance signal $C_c$ and the FM audio signal components which had been recorded are separated from the mixed signals. Bandpass filters 23 and 24 separate the respective FM audio signal components, and each is demodulated by a respective one of FM demodulators 27 and 28. Additionally, frequency demodulator 32 serves to demodulate the luminance component $Y'$ from the frequency modulated luminance signal $Y_f$. FIG. 5A illustrates the recovered luminance component $Y'$ having vertical blanking intervals $T'_b$ in which vertical synchronizing pulses $S'_v$ are provided. These vertical synchronizing pulses are separated by sync separator 33 to recover the pulses $P'_v$ shown in FIG. 5B. These pulses trigger pulse generator 34 to produce the sampling pulses $P'_b$ shown in FIG. 5C.

From the previous discussion of the protocol used by the recording circuitry shown in FIG. 2, it is recalled that when one type of audio signal is recorded, such as stereophonic audio signals, the amplitude of the FM audio signal envelope remains constant, even during the video signal blanking intervals. However, when an audio signal of another type, such as a bilingual audio signal having main and auxiliary channels, is recorded, the amplitude of the FM audio signal envelope changes during the video signal blanking intervals, namely, the amplitude increases. Envelope detector 36 detects the envelope of the FM audio signal component passed by bandpass filter 23; and FIG. 5D illustrates the detected envelope $S_d$ as having a constant magnitude V1 even during blanking intervals $T'_b$. This envelope $S_d$ is filtered by low pass filter 37 to produce the reference amplitude $V_a$ shown in FIG. 5E. This reference amplitude exhibits a magnitude V1' which is derived from the magnitude of the envelope extant between blanking intervals $T'_b$.

Sampling circuit 35 responds to the sampling pulses $P'_b$ (FIG. 5C) to sample the detected envelope $S_d$ during the blanking intervals. The sampled envelope amplitude $V_b$ is illustrated in FIG. 5F; and it is seen that the sampled envelope exhibits a magnitude V1' substantially equal to the magnitude of the reference amplitude $V_a$. Accordingly, when comparator 38 compares the sampled envelope amplitude $V_b$ to the reference amplitude $V_a$, the output control signal $V_c$ exhibits a magnitude that is substantially equal to zero, as shown in FIG. 5G. Selector switches 30 and 31 respond to this zero amplitude control signal $V_c$ to couple the outputs of matrix circuit 29 to output terminals 39 and 40. Thus, the matrix circuit is connected in circuit to recover the left channel and right channel audio signals SL and SR (which were supplied originally to input terminals 1 and 2 of the recording circuitry shown in FIG. 2) from the demodulated audio signals and to supply those audio signals SL and SR to the output terminals. Hence, this type of audio signal is subjected to an appropriate audio signal processing operation at the reproducing circuitry.

If main and auxiliary channels, such as are provided in bilingual audio programs, had been recorded, the level of the envelope of the FM audio signals during video blanking intervals is increased, as shown in FIG. 3E. Accordingly, when these signals are reproduced, envelope detector 36 produces the detected envelope signal $S_d$ shown in FIG. 5H. Here, the peak-to-peak magnitude of the envelope during video blanking intervals $T'_b$ is equal to V2 and the peak-to-peak magnitude of the envelope extant between the video blanking intervals is equal to V1. It is seen that this magnitude V1 is the same for both stereophonic signals and bilingual (or other types of) signals. Filter 37 is effectively non-responsive to rapid changes in the envelope during the blanking intervals and, thus, the filter produces the reference amplitude $V_a$ shown in FIG. 5I, having a magnitude equal to V1' which is substantially the same as that of the reference amplitude produced when stereophonic audio signals are recovered, as shown in FIG. 5E.

Sampling circuit 35 responds to the sampling pulses $P'_b$ (FIG. 5C) to sample the detected envelope $S_d$ during the video blanking intervals. FIG. 5J illustrates the sampled envelope, and it is appreciated that the magnitude of the sampled envelope is equal to V2' which is greater than the reference amplitude V1'. Comparator 38 now produces the control signal $V_c$ which is proportional to the difference between the sampled amplitude $V_b$ and the reference amplitude $V_a$. As shown in FIG. 5K, this control signal $V_c$ exhibits a magnitude V3', where V3' = V2' − V1'.

Selector switches 30 and 31 respond to the control signal $V_c$ shown in FIG. 5K to couple the outputs of FM demodulators 27 and 28 directly to output terminals 39 and 40. Matrix circuit 29 thus is bypassed; and the demodulated main and auxiliary channels are supplied as the audio signal outputs of the reproducing circuitry.

It is appreciated, therefore, that a particular type of audio processing may be selected automatically as a function of the amplitude of the FM audio signal envelope during video signal blanking intervals. In the particular example discussed herein, a stereophonic matrixing operation is selected when the amplitude of the FM audio signal envelope during the blanking intervals is equal to the amplitude thereof extant between those blanking intervals. However, the matrixing operation is bypassed when the amplitude of the FM audio signal envelope during the blanking intervals differs from the amplitude between those intervals. For example, if the amplitude during the blanking intervals is greater than the envelope amplitude extant between those intervals, the matrixing operation is bypassed. Consequently, there is no need for an operator to select a particular type of audio processing operation as a function of the type of audio signal which had been recorded. Therefore, ignorance of the type of audio signal will not result in selecting an improper audio signal processor. The possibility of supplying a particular type of audio signal to an incompatible audio processing circuit is obviated.

While the present invention has been particularly shown and described with reference to preferred embodiments, it will be readily appreciated by those of ordinary skill in the art that various changes and modifications may be made without departing from the spirit and scope of the invention. For example, in the preceding discussion, only two different types of audio signals are distinguished as a function of the envelope amplitude of the FM audio signal components during the video blanking intervals. It is appreciated that several types of audio signals may be distinguished by assigning predetermined levels associated with respective types of audio signals to the FM audio signal components during the blanking intervals. Thus, several different audio processing circuits may be selectively connected to supply processed audio signals to the frequency modulators in the recording circuitry and to process demodulated audio signals received from the frequency demodulators in the reproducing circuitry. Still further, rather than providing selector switches to couple the processed audio signals to the modulators from the audio processing circuits in the recording circuitry, or to couple the reproduced, processed audio signals from the processing circuits in the producing circuitry, the processing circuits may be selectively enabled as a function of the level of the control signal SS and as a function of the detected envelope amplitude. Moreover, while stereophonic and bilingual audio signals have been discussed above, it will be appreciated that other types of audio signals may be accommodated by the present invention.

Therefore, it is intended that the appended claims be interpreted as covering the particular embodiments described herein, the alternatives which have been discussed throughout and which have been particularly mentioned above, and all equivalents thereto.

What is claimed is:

1. Apparatus for recording and reproducing video and audio signals on a record medium, wherein the audio signal may be of at least two different types subjected to respectively different types of audio processing, said apparatus comprising:
    a recording section, including video signal supply means for supplying a video signal having blanking intervals therein; FM modulating means for producing frequency modulated (FM) audio signal components; level adjusting means for selectively adjusting the level of at least one FM audio signal component during blanking intervals as a function of the type of audio signal being modulated; and combining means for combining the FM audio signal components and the video signal;
    transducer means for recording the combined FM audio signal components and video signal on a record medium and for reproducing combined FM audio signal components and video signal from a record medium; and
    a reproducing section including separating means for separating the reproduced FM audio signal components from the reproduced video signal; level detecting means for detecting the level of at least one separated FM audio signal component during blanking intervals; FM demodulating means for producing demodulated audio signals from the FM audio signal components; and audio signal processing means responsive to the detected level of the separated FM audio signal component to process the demodulated audio signals in accordance with a selected type of audio processing.

2. The apparatus of claim 1 wherein said FM audio signal components comprise two audio channels.

3. The apparatus of claim 2 wherein said FM modulating means comprises first and second modulator circuits supplied with respective ones of said audio channels and with respective carriers for modulating said carriers with respective audio channels and thereby produce two frequency modulated carriers.

4. The apparatus of claim 3 further comprising selecting means for supplying respective audio channels of a first type of audio signal to said first and second modulator circuits, and for supplying respective audio channels of a second type of audio signal to said first and second modulator circuits.

5. The apparatus of claim 4 wherein said selecting means comprises first and second switch means, each coupled to a respective modulator circuit and each controlled to supply a first type of audio signal or a second type of audio signal to the modulator circuit coupled thereto.

6. The apparatus of claim 5 further comprising control means for controlling said first and second switch means to supply the first type or second type of audio signals to the first and second modulator circuits and for controlling said level adjusting means to change the level of at least one of the modulated carriers during blanking intervals when a predetermined type of audio signal is supplied to said modulator circuits.

7. The apparatus of claim 6 wherein said blanking intervals comprise vertical blanking intervals.

8. The apparatus of claim 6 wherein said blanking intervals comprise horizontal blanking intervals.

9. The apparatus of claim 6 wherein said level adjusting means comprises synchronizing separating means for separating a synchronizing signal from a video signal applied to said apparatus, pulse generating means responsive to the separated synchronizing signal for generating a pulse of duration substantially equal to said blanking interval, level increasing means for receiving at least one of the modulated carriers and responsive to said generated pulse for increasing the level of said at least one modulated carrier, and third switch means operable by said control means to supply said generated pulse to said level increasing means.

10. The apparatus of claim 9 further comprising summing means for summing the two frequency modulated carriers and supplying the summed frequency modulated carriers to said level increasing means, whereby the levels of both frequency modulated carriers are increased in response to said generated pulse.

11. The apparatus of claim 4, further comprising stereophonic signal processing means for producing sum and difference audio channels, respectively; and wherein said selecting means is operative to supply the sum audio channel to said first modulator circuit and the difference audio channel to said second modulator circuit.

12. The apparatus of claim 11 wherein said stereophonic signal processing means comprises a source of left-channel and right-channel audio signals, and matrix means for combining the left-channel and right-channel audio signals to produce said sum and difference audio channels.

13. The apparatus of claim 11, further comprising a source of main and auxiliary audio channels; and wherein said selecting means is further operative to supply the main audio channel to said first modulator circuit and the auxiliary audio channel to said second modulator circuit.

14. The apparatus of claim 1 wherein said first type of audio signal comprises a stereophonic audio signal having left and right channels matrixed to produce sum and difference audio signals, wherein a second type of audio signal comprises a bilingual audio signal having main and auxiliary channels, wherein said FM modulating means comprises a first modulating circuit selectively supplied with said sum audio signals or with said main channel to produce a first FM signal and a second modulating circuit selectively supplied with said difference audio signals or with said auxiliary channel to produce a second FM signal, and wherein said level adjusting means increases the level of at least one of said FM signals when the main and auxiliary channels are supplied to said first and second modulating circuits.

15. The apparatus of claim 1 wherein said level detecting means comprises blanking interval sensing means for sensing blanking intervals in the video signal reproduced from said record medium; enabling means responsive to the sensed blanking intervals for establishing enabling intervals; and level sensing means coupled to receive said at least one separated FM audio signal component for sensing the level thereof during said enabling intervals.

16. The apparatus of claim 15 wherein said level sensing means comprises envelope detecting means for detecting an envelope amplitude of said at least one separated FM audio signal component; sampling means for sampling said envelope amplitude during an enabling interval; and comparator means for comparing the sampled envelope amplitude to a reference amplitude.

17. The apparatus of claim 16 wherein said FM audio signal components include first and second frequency modulated carriers; and wherein said envelope detecting means is coupled to receive one of said frequency modulated carriers.

18. The apparatus of claim 15 wherein the video signal reproduced from said record medium includes a modulated luminance component; and wherein said blanking interval sensing means includes demodulating means coupled to said separating means for demodulating the luminance component, and sync separating means for separating a synchronizing signal from the demodulated luminance component to sense the blanking interval which contains said synchronizing signal.

19. The apparatus of claim 18 wherein said enabling means comprises a triggerable pulse generator triggered by said synchronizing signal to generate an enable pulse of predetermined duration.

20. The apparatus of claim 15 wherein said blanking intervals comprise vertical blanking intervals.

21. The apparatus of claim 15 wherein said blanking intervals comprise horizontal blanking intervals.

22. The apparatus of claim 1 wherein said audio signal processing means includes a processing circuit for receiving demodulated audio signals and for producing processed audio signals therefrom; and selecting means for selecting audio signals processed by said processing circuit or audio signals not processed by said processing circuit as a function of the detected level of the separated FM audio signal component.

23. The apparatus of claim 22 wherein said selecting means comprises switch means controlled by said level detecting means for selecting either the audio signals processed by said processing circuit or the audio signals not processed by said processing circuit.

24. The apparatus of claim 22 wherein one type of audio signal is a stereophonic audio signal having sum and difference components frequency modulated onto first and second carriers, respectively, and said processing circuit includes a matrix circuit for combining demodulated sum and difference components to produce left channel and right channel audio signals.

25. The apparatus of claim 24 wherein said FM demodulating means includes first and second FM demodulating circuits for demodulating said first and second carriers, respectively.

26. The apparatus of claim 25 wherein another type of audio signal comprises main and auxiliary channels frequency modulated onto said first and second carriers, respectively; and wherein said selecting means includes switch means controlled by said level detecting means for selecting either said left channel and right channel audio signals from said matrix circuit or said main and auxiliary channels from said FM demodulating circuits.

27. Apparatus for recording video and audio signals on a record medium, wherein the audio signal may be of at least two different types subjected to respectively different types of audio processing, said apparatus comprising video signal supply means for supplying a video signal having blanking intervals therein; FM modulating means for producing frequency modulated (FM) audio signal components; level adjusting means for selectively adjusting the level of at least one FM audio signal component during blanking intervals to indicate the type of audio signal being modulated; and combining means for combining the FM audio signal components and the video signal for recording.

28. The apparatus of claim 27 wherein said FM audio signal components comprise two audio channels.

29. The apparatus of claim 28 wherein said FM modulating means comprises first and second modulator circuits supplied with respective ones of said audio channels and with respective carriers for modulating said carriers with respective audio channels and thereby produce two frequency modulated carriers.

30. The apparatus of claim 29 further comprising selecting means for supplying respective audio channels of a first type of audio signal to said first and second modulator circuits, and for supplying respective audio channels of a second type of audio signal to said first and second modulator circuits.

31. The apparatus of claim 30 wherein said selecting means comprises first and second switch means, each coupled to a respective modulator circuit and each controlled to supply a first type of audio signal or a second type of audio signal to the modulator circuit coupled thereto.

32. The apparatus of claim 31 further comprising control means for controlling said first and second switch means to supply the first type or second type of audio signal to the first and second modulator circuits and for controlling said level adjusting means to change the level of at least one of the modulated carriers during blanking intervals when a predetermined type of audio signal is supplied to said modulator circuit.

33. The apparatus of claim 32 wherein said blanking intervals comprise vertical blanking intervals.

34. The apparatus of claim 32 wherein said blanking intervals comprise horizontal blanking intervals.

35. The apparatus of claim 32 wherein said level adjusting means comprises synchronizing separating means for separating a synchronizing signal from a video signal applied to said apparatus, pulse generating means responsive to the separated synchronizing signal for generating a pulse of duration substantially equal to said blanking interval, level increasing means for receiving at least one of the modulated carriers and responsive to said generated pulse for increasing the level of said at least one modulated carrier, and third switch means operable by said control means to supply said generated pulse to said level increasing means.

36. The apparatus of claim 35 further comprising summing means for summing the two frequency modulated carriers and supplying the summed frequency modulated carriers to said level increasing means, whereby the levels of both frequency modulated carriers are increased in response to said generated pulse.

37. The apparatus of claim 30, further comprising stereophonic signal processing means for producing sum and difference audio channels, respectively; and wherein said selecting means is operative to supply the sum audio channel to said first modulator circuit and the difference audio channel to said second modulator circuit.

38. The apparatus of claim 37 wherein said stereophonic signal processing means comprises a source of left-channel and right-channel audio signals, and matrix means for combining the left-channel and right-channel audio signals to produce said sum and difference audio channels.

39. The apparatus of claim 37, further comprising a source of main and auxiliary audio channels; and wherein said selecting means is operative to supply the main audio channel to said first modulator circuit and the auxiliary audio channel to said second modulator circuit.

40. The apparatus of claim 27 wherein said first type of audio signal comprises a stereophonic audio signal having left and right channels matrixed to produce sum and difference audio signals, wherein a second type of audio signal comprises a bilingual audio signal having main and auxiliary channels, wherein said FM modulating means comprises a first modulating circuit selectively supplied with said sum audio signals or with said main channel to produce a first FM signal and a second modulating circuit selectively supplied with said difference audio signals or with said auxiliary channel to produce a second FM signal, and wherein said level adjusting means increases the level of at least one of said FM signals when the main and auxiliary channels are supplied to said first and second modulating circuits.

41. Apparatus for reproducing video and audio signals from a record medium, wherein the audio signals are recorded as FM audio signal components and may be of at least two different types subjected to respectively different types of audio processing and wherein the type of audio signal is indicated by the level of at least one of said FM audio signal components during an interval thereof corresponding to a blanking interval of said video signal, said apparatus comprising: separating means for separating reproduced FM audio signal components from reproduced video signals; level detecting means for detecting the level of at least one separated FM audio signal component during blanking intervals; FM demodulating means for producing demodulated audio signals from the FM audio signal components; and audio signal processing means responsive to the detected level of the separated FM audio signal component to process the demodulated audio signals in accordance with a selected type of audio processing.

42. The apparatus of claim 41 wherein said level detecting means comprises blanking interval sensing means for sensing blanking intervals in the reproduced video signal; enabling means responsive to the sensed blanking intervals for establishing enabling intervals; and level sensing means coupled to receive said at least one separated FM audio signal component for sensing the level thereof during said enabling intervals.

43. The apparatus of claim 42 wherein said level sensing means comprises envelope detecting means for detecting an envelope amplitude of said at least one separated FM audio signal component; sampling means for sampling said envelope amplitude during an enabling interval; and comparator means for comparing the sampled envelope amplitude to a reference amplitude.

44. The apparatus of claim 43 wherein said comparator means includes reference generating means for sensing the envelope amplitude of said at least one FM audio signal component extant between blanking intervals to generate a reference amplitude derived therefrom.

45. The apparatus of claim 43 wherein said FM audio signal components include first and second frequency modulated carriers; and wherein said envelope detecting means is coupled to receive one of said frequency modulated carriers.

46. The apparatus of claim 42 wherein the reproduced video signal includes a modulated luminance component; and wherein said blanking interval sensing means includes demodulating means coupled to said separating means for demodulating the luminance component, and sync separating means for separating synchronizing signals from the demodulated luminance component to sense the blanking intervals which contain said synchronizing signals.

47. The apparatus of claim 46 wherein said enabling means comprises a triggerable pulse generator triggered by said synchronizing signal to generate an enable pulse of predetermined duration.

48. The apparatus of claim 42 wherein said blanking intervals comprise vertical blanking intervals.

49. The apparatus of claim 42 wherein said blanking intervals comprise horizontal blanking intervals.

50. The apparatus of claim 41 wherein said audio signal processing means includes a processing circuit for receiving demodulated audio signals and for producing processed audio signals therefrom; and selecting means for selecting audio signals processed by said processing circuit or audio signals not processed by said processing circuit as a function of the detected level of the separated FM audio signal component.

51. The apparatus of claim 50 wherein said selecting means comprises switch means controlled by said level detecting means for selecting either the audio signals processed by said processing circuit or the audio signals not processed by said processing circuit.

52. The apparatus of claim 50 wherein one type of audio signal is a stereophonic audio signal having sum and difference components frequency modulated onto first and second carriers, respectively, and said processing circuit includes a matrix circuit for combining the demodulated sum and difference components to produce left channel and right channel audio signals.

53. The apparatus of claim 52 wherein said FM demodulating means includes first and second FM demodulating circuits for demodulating said first and second carriers, respectively.

54. The apparatus of claim 53 wherein another type of audio signal comprises main and auxiliary channels frequency modulated onto said first and second carriers, respectively; and wherein said selecting means includes switch means controlled by said level detecting means for selecting either said left channel and right channel audio signals from said matrix circuit or said main and auxiliary channels from said FM demodulating circuits.

55. Apparatus for reproducing and demodulating frequency modulated luminance signals and frequency modulated audio signals that had been recorded on a record medium as mixed signals of respectively different frequency spectra, with the frequency modulated audio signals having an envelope whose level is selectively changed during vertical blanking intervals of the frequency modulated luminance signals, said apparatus comprising:

low pass filter means for filtering the frequency modulated audio signals reproduced from said record medium;

sampling means for sampling the frequency modulated audio signals reproduced from said record medium during said vertical blanking intervals;

comparator means for comparing the filtered frequency modulated audio signals to the sampled frequency modulated audio signals; and switch means responsive to said comparator means for coupling demodulated audio signals through an audio signal processor when the filtered and sampled frequency modulated audio signals are of substantially equal levels, and for bypassing said audio signal processor when the filtered and sampled frequency modulated audio signals are of different levels.

56. Apparatus for recording and reproducing video and audio signals on a record medium, comprising:

a recording section, including video signal supply means for supplying a frequency modulated (FM) video component having blanking intervals therein; audio signal supply means for supplying an audio signal; FM modulating means for frequency modulating the audio signal; level adjusting means for selectively adjusting the level of the frequency modulated (FM) audio signal during blanking intervals if the supplied audio signal is of a predetermined type; and mixing means for frequency mixing the FM audio signal and the FM video component;

transducer means for recording the frequency mixed FM audio signal and the FM video component on a record medium and for reproducing the frequency mixed FM audio signal and FM video component from a record medium; and a reproducing section including separating means for separating the reproduced FM audio signal from the reproduced FM video component; envelope detecting means coupled to said separating means for detecting an envelope of the reproduced FM audio signal; low pass filter means coupled to said envelope detecting means for filtering the FM audio signal envelope; sampling means coupled to said envelop detecting means for sampling the FM audio signal envelope during blanking intervals of the reproduced FM video component; comparator means for comparing the filtered envelope to the sampled envelope; FM demodulating means for demodulating the FM audio signal; audio signal processing means for processing the demodulated audio signal in accordance with said predetermined type of signal; and switch means responsive to said comparator means for selecting the processed demodulated audio signal when the filtered and sampled envelopes are of substantially equal levels and for selecting the demodulated audio signal that is not processed by said audio signal processing means when the filtered and sampled envelopes are of different levels.

57. Apparatus for recording video and audio signals on a record medium, comprising:

video signal supply means for supplying a frequency modulated (FM) video component having blanking intervals therein;

audio signal supply means for supplying first and second channels of audio signals;

audio signal processing means for selectively processing the first and second channels of audio signals to produce first and second processed audio channels;

frequency modulating means for modulating first and second carriers with said first and second channels of audio signals or with said first and second processed audio channels;

switch means having a first state for supplying said first and second channels of audio signals to said frequency modulating means and a second state for supplying said first and second processed audio channels to said frequency modulating means;

summing means for summing the modulated first and second carriers;

level adjusting means coupled to said summing means for level adjusting the summed carriers only if said switch means admits of a predetermined one of its first and second states; and frequency mixing means coupled to said level adjusting means for frequency mixing the summed carriers and the FM video component for recording.

* * * * *